June 16, 1959 C. H. MILLER 2,891,110
AMPLIFYING DEVICES FOR TELEPHONE HAND-SETS
Filed Sept. 12, 1956
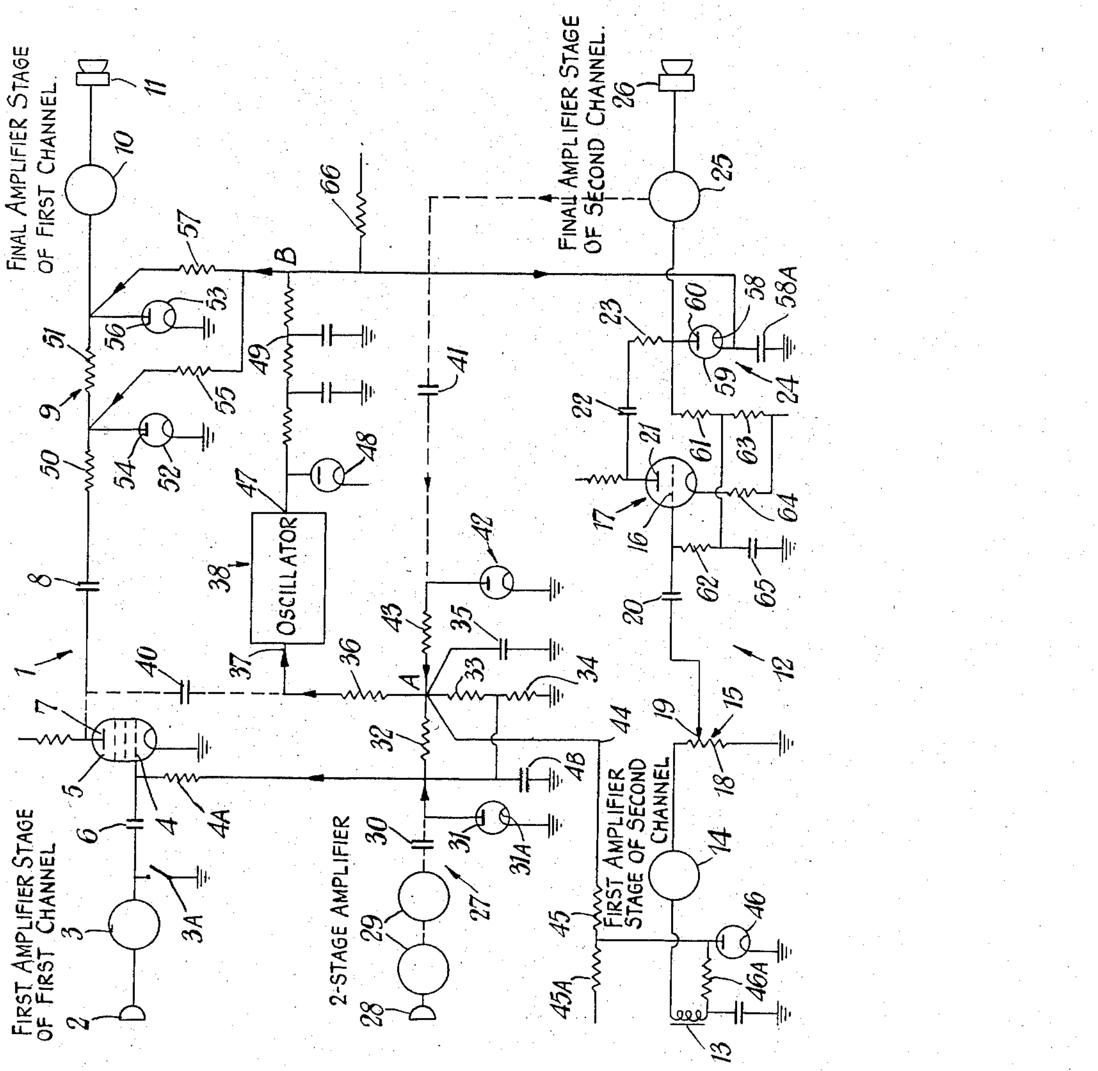

2,891,110
Patented June 16, 1959

2,891,110

AMPLIFYING DEVICES FOR TELEPHONE HAND-SETS

Charles Harcourt Miller, Burwood, New South Wales, Australia, assignor to S. E. Opperman Limited, Boreham Woods, England, a British company Application September 12, 1956, Serial No. 609,493

7 Claims. (Cl. 179—1)

This invention relates to amplifying devices for use with telephone hand-sets, such devices being of the type comprising a first signal channel including a microphone, a first amplifying means, a first loudspeaker for operation by the output from the amplifying means, said first loudspeaker being arranged to supply audible signals to the mouthpiece of a conventional telephone hand-set; a second signal channel including means responsive to signals derivable from the ear-piece of the hand-set, a second amplifying means for such signals, and a second loudspeaker for operation by the output of said second amplifying means, and switching means for maintaining either one of the channels ineffective as regards transmission of signals applied thereto.

According to the present invention there is provided an amplifying device of the type referred to, wherein said switching means includes an electronic oscillator which is arranged to produce an oscillating output in response to a control voltage input in such a way that when said voltage exceeds a predetermined value an oscillating output is at once obtained and continues until the instant when said voltage no longer exceeds the predetermined value, and wherein one of said channels has an electronic switch device therein which renders such channel ineffective for transmission of voice signals to its loudspeaker when no incoming signals are being applied to either channel, whereby the other channel is normally operative, there being a connection between said one channel and the voltage input to said electronic oscillator and between the output of the electronic oscillator and said electronic switch device, the connections and arrangement being such that when voice signals are being effectively transmitted in said other channel the electronic oscillator is in a condition such that the said electronic switch device makes said one channel ineffective whilst when such voice signals cease and when voice signals are applied to said one channel, the control voltage input is derived therefrom for said electronic oscillator which latter at once causes said electronic switch device to assume an operative position where said one channel is effective for transmission of speech signals to its loudspeaker.

For a better understanding of the invention and to show how the same may be carried into effect, reference will now be made to the accompanying drawing which is a circuit diagram of an amplifying device for use with telephone hand-sets.

An audio-frequency amplifying channel 1 is provided between a microphone 2 and the mouthpiece of a telephone hand-set (not shown) to enable a telephone user to speak into said mouth-piece with the aid of a microphone. The amplifying channel 1 includes a three stage amplifier, the first stage 3 of which is of variable gain and is connected to receive input signals from the microphone 2. Output signals from the first stage 3 are fed to the control grid 4 of a pentode valve 5 forming the second stage of the three stage amplifier. An on-off switch 3A is provided for the first channel. A capacitance 6 is provided in the signal path from the first stage 3 to the control grid 4 to allow a D.C. gain controlling bias to be applied via the resistance 4A to the control grid 4 of the valve 5.

Output from valve 5 is taken from the anode 7 thereof, and is fed via a capacitance 8, and an electronic switching arrangement 9 to the input of the final stage 10 of the three stage amplifier. The final stage 10 acts as an amplifier for a loudspeaker 11, the latter being arranged for feeding energy to the mouth-piece of the telephone hand-set.

A second audio-frequency amplifying channel 12 is used for detecting and amplifying audio-signals received at the ear-piece of the hand-set (not shown) and for reproducing the received signals in a loudspeaker.

The channel 12 includes an inductive pick-up 13, which is arranged to receive, as input, output signals magnetically induced from the ear-piece of the hand-set. Voltage output from the pick-up 13 is applied to a first stage 14 of a multi-stage amplifier provided in the channel 12. The stage 14 applies an amplified signal via an adjustable amplifier gain control arrangement 15 to the control grid 16 of a valve 17, the latter forming the second amplifier stage of the amplifying channel 12. The gain control arrangement 15 includes a resistance 18 connected between the output of stage 14 and earth together with a variable tap 19 for taking off the desired signal strength, the latter being fed via a capacitance 20 to said control grid 16. Amplified output from the valve 17 is taken from the anode 21 thereof and is fed to the input of the final amplifying stage 25 of the amplifying channel 12 via a capacitance 22, a resistance 23 and an electronic switching arrangement 24. Output from the stage 25 is applied as input to a loudspeaker 26. The loudspeaker 26 reproduces audibly with amplification the magnetically induced signals received at the ear-piece of the hand-set. Output from the stage 25 is also fed via a capacitance 41 to an input 37 of a switching oscillator 38.

In order to take into account the effects of ambient noise around the amplifying device a third amplifying channel 27 is included in the amplifying device. The channel 27 includes a microphone 28 the function of which is to detect surrounding noise signals, and a two-stage variable gain amplifier 29. Output from the amplifier 29 is fed via a capacitance 30, the anode of a diode rectifier 31 whose cathode 31A is earthed, and a resistance 32 to a point A.

Output signals from the third stage 25 of the amplifying channel 12 are also applied via a capacitance 41, a rectifier 42 and resistance 43 to the point A. The pair of series connected resistances 33, 34 is connected between the point A and earth, forming a return path common to both diodes 31 and 42. A smoothing capacitance 35 is also connected from point A to earth. By this means the output signals, when present, of the two amplifying channels 12 and 27 may be combined and applied as a smooth negative D.C. bias via resistance 36 to the input 37 of the switching oscillator 38.

Output from the valve 5 of amplifying channel 1 is also fed to the input 37 of the switching oscillator 38, a direct A.C. connection being made from the anode 7 of the valve 5 via a capacitance 40.

Switching oscillator 38 is an electronic oscillator biased in the non-oscillating condition in such a manner that when the peaks of waveform of the alternating input from the anode 7 of the valve 5 exceeds a predetermined value the oscillator at once produces oscillations for so long as the predetermined value is exceeded. In the present instance the switching oscillator 38 may consist of a conventional multi-vibrator, an initial predetermined operating point being controlled by a positive potential applied in series with the input 37.

The effect of the negative D.C. bias applied to the input 37 of the oscillator 38 from point A via the resistance 36 is to raise the level of the operating point at which the oscillator can be caused to oscillate by the alternating signal from valve 5. To prevent excitation of the oscillator 38 by very large alternating signals from the anode 7 of valve 5, a fraction of the negative bias at the point A is fed from the junction of the resistances 33 and 34 via resistance 4A to the control grid of valve 5, in order to reduce the amplification of valve 5. Capacitance 4B serves as an additional smoothing arrangement.

An automatic volume control line 44 for the second amplifying channel is connected between the point A and the input of the first stage 14 of the amplifying channel 12. The line 44 includes a resistance 45 and a diode 46. A positive bias from a source of positive potential (not shown) is applied via a resistance 45A to the anode of the diode 46. The diode 46 serves to delay the action of the automatic volume control. The cathode of the diode 46 is earthed, while the anode thereof is connected via a resistance 46A and the pick-up inductor 13 to the control grid of the valve of the first stage 14.

The switching oscillator has an output 47 which is connected to a point B, via a diode rectifier 48 and a delay resistance-capacitance-network 49. The signal which appears at B and which emanates from the switching oscillator is used for controlling the operation of the electronic switching arrangements 9 and 24.

The switching arrangement 9, provided in the signal path of the first amplifying channel 1 includes, after the capacitance 8, a pair of series connected resistances 50 and 51. The anode 54 of a diode 52 is connected to the junction of the resistances 50 and 51. The cathode of the diode 52 is earthed. In addition the anode 54 is connected via a resistance 55 to the point B. That end of the resistance 51 which is remote from said junction is connected to the anode 56 of a diode 53 whose cathode is earthed, and to the point B by way of a resistance 57.

The point B is also connected to the cathode 58 of a diode valve 59, which latter forms part of the switching arrangement 24. The anode 60 of the diode 59 is connected to the anode 21 of the valve 17 via the resistance 23 and capacitance 22, and also the control grid 16 of the valve 17, via a resistance 61 and a resistance 62. The junction of the resistances 61 and 62 is connected to a positive source of potential (not shown) through a resistance 63. The cathode of the valve 17 is connected to this source by way of a resistance 64 whilst a capacitance 65 acts as a decoupling capacitance for the control grid 16.

A further source of positive potential (not shown) is connected to the point B via a resistance 66, to provide positive biasing potentials for the anodes of the diodes 48, 52 and 53 and the cathode 58 of the diode 59.

When there are no voice signals in either of the channels 1 or 12 the initial switching conditions of the switching arrangements 9 and 24 are such that the amplifying channel 1 is normally suppressed, i. e. ineffective, whilst the amplifying channel 12 is normally actively effective.

To achieve the suppressed state in the first amplifying channel 1, the D.C. potential appearing at the anode 54 of the diode 52 causes it to conduct so that any low level signals, appearing in the signal path of the first channel, but of insufficient amplitude to trigger the oscillator 38, are fed through the diode 52 to earth. To ensure that any residual signals, which may by-pass the diode 52, do not reach the final amplifier stage 10, the second diode 53 acts in a similar manner to the diode 52. That is to say the diode 53 offers a low resistance path to signals in the first channel 1. Thus as a result of the dual effects of the diodes 52 and 53 no signals will reach the loudspeaker 11. The biasing potentials on the diodes 52 and 53 are derived from the positive source, connected to the resistance 66, the potentials being fed to the anodes 54 and 56 via the resistances 55 and 57 respectively.

The second amplifying channel 12, as previously mentioned, is normally receptive to incoming signals at the ear-piece of the hand-set. Any such incoming signals are detected by the inductor pick-up 13, and are fed to the first amplifier stage 14, wherein they are amplified. The output from the first stage 14 is applied to the control grid 16 of the valve 17 via the amplifier gain control device 15. Output from the valve 17 is fed by way of the switching arrangement 24 to the last stage 25 of the amplifying channel 12, and thence to the loudspeaker 26, the biasing potentials applied to the cathode 58 and anode 60 of the diode 59 of the switching arrangement 24 being such that the diode 59 is normally non-conductive.

Upon the receipt of an incoming signal at the ear-piece of the hand-set the amplified version of this appearing at the output of the final amplifier stage 25 of the amplifying channel 12 is utilised to modify the switching conditions so that the amplifying channel 1 is suppressed even against large acoustic inputs to the microphone 1. The amplified output signal is fed from the final amplifier stage 25 to the anode of the diode 42 via capacitance 41. The diode rectifies this A.C. signal and the resulting negative D.C. potential is fed via the resistance 43 to the point A, charging the capacitance 35 negatively. This negative potential is then applied via the resistance 36 to the input 37 of the switching oscillator 38, and fractionally via resistance 4A to the control grid 4 of valve 5 thereby reducing the gain of the latter, so that the A.C. output fed from the anode 7 via the capacitance 40 to the input 37 cannot override the D.C. bias there applied, and so cause the oscillator 38 to function. The residual amplified output of the valve 5 is fed into the switching arrangement 9, which latter will, remaining conducting, prevent this output from reaching the stage 10 and the loudspeaker 11.

When the inductor pick-up 13 ceases to pick up signals from said ear-piece, the negative biasing potential arising from the final stage 25 and which is applied to the input 37 of the oscillator 38, disappears. The switching oscillator 38 may then be triggered by any voice or noise signal received by the microphone 2 and which, after amplification is fed from the anode 7 of the valve 5 to the input 37 at sufficient amplitude for the signal peaks to exceed the predetermined operating point. The output of the oscillator, thus caused to function, is rectified by the diode 48, and appears at point B as a smoothed negative bias. The amplitude of this negative bias is large enough to overcome completely the effect of the standing positive bias at the point B, so that a negative potential is fed via resistances 55 and 57 to the anodes 54 and 56 of the diodes 52 and 53 rendering these non-conducting. Voice or noise signals at the anode 7 of valve 5 then pass via capacitance 8, resistances 50 and 51 to valve 10 and the loudspeaker 11, which latter transmits them into the mouth-piece of the telephone.

At the same time the negative bias from the point B is applied to the cathode 58 of the diode 59 causing this to conduct and bypass any subsequent signal flowing through resistance 23 to earth via capacitance 58A. The negative bias from point B also flows via diode 59, resistances 61 and 62 to the control grid 16 of valve 21, thereby reducing its gain or cutting it off.

As stated either a voice or noise signal received by the microphone 2 of channel 1 will cause this latter to become operative and to suppress amplifying channel 12. A constant noise could thus cause permanent suppression of channel 12 and upset the proper function of the complete amplifying device.

To prevent this, a noise microphone 28 is provided simultaneously to detect and pick up any general surrounding noise signal and these latter mentioned noise signals are amplified in the amplifier 29.

The A.C. output from the amplifier 29 is fed by way of the capacitance 30 to the anode of the diode 31 which latter produces a negative D.C. potential representative of the output from the amplifier 29. This latter mentioned negative D.C. signal is applied via the resistance 32, the point A, and resistance 36 to the input 37 of the switching oscillator 38. The effect on the oscillator 38 of this latter mentioned negative D.C. potential is arranged just to counteract the effects produced by the A.C. potential representative of surrounding noise detected at the microphone 2, and so prevent operation of the oscillator 38 by these said A.C. noise potentials. The mentioned negative D.C. potentials derived from the output of amplifier 29 are small and do not prevent subsequent operation of the oscillator 38 by normal voice signals.

Recapitulating, it will be noted that there are simultaneously applied to the switching oscillator 38, three potentials, namely an A.C. potential applied to the input 37, which is characteristic of surrounding noise signals picked up by the microphone 2 in the first amplifying channel 1, a negative D.C. potential, fed to the input 37, characteristic of surrounding noise signals detected by the microphone 28 in the third amplifying channel 27, and a negative D.C. potential, applied to the input 37, derived from the incoming speech signals received by the inductor pick-up 13. The D.C. potential derived from the rectifier 42 is of sufficient magnitude to prevent the user's voice, when speaking into the microphone 2, from operating the switching oscillator 38. Thus it will be seen that so long as signals are being received at the inductor pick-up 13, the user cannot trigger the oscillator 38. Consequently the switching oscillator 38 is maintained in its initial state, in which no output signal is obtainable therefrom.

As a further safeguard to prevent the triggering of the oscillator whilst incoming signals are appearing at the hand-set the gain of the valve 5 is reduced by a further D.C. potential obtained from point A by reason of the charging of the capacitance 35. This latter mentioned D.C. potential is a fraction of that fed to input 37, and is applied to the control grid 4, via the resistance 4A. The gain of the valve 5 is progressively reduced in relation to the increase of the negative potential on capacitance 35, which latter is charged in relation to the output from the final stage 25. This reduction in gain ensures that the positive peaks of any noise signals picked up by the microphone 2 cannot overcome the effects of the negative D.C. potentials applied to input 37 of the oscillator 38, thereby to trigger the latter.

The automatic volume control circuit for the second amplifying channel operates as follows: The negative D.C. potential produced at A, as a result of the A.C. signal fed from amplifier stage 25, is applied along the line 44, via the resistance 45, to the anode of the diode 46. The biasing potentials of the diode 46 are such that it normally conducts, that is to say there is a direct conductive path therethrough to earth. However, when the negative D.C. potential produced at A attains a predetermined value, the diode 46 ceases to conduct, hence any negative bias, exceeding this predetermined value, is applied to the input side of the amplifier stage 14, by way of the resistance 46A and the inductor pick-up 13.

Since a finite time period is required for the D.C. potential resulting from the A.C. signals obtained from incoming sound signals in the second channel, to attain said predetermined value, the action of the automatic volume control circuit is delayed inasmuch as it is only operative whenever the D.C. voltage exceeds said predetermined value.

When the inductor pick-up ceases to pick up signals from said ear-pieces the negative biasing potential, which arises from the final stage 25 and which is applied to the input 37 of the oscillator 38, disappears. When, however, surrounding noise alone is picked up by the microphone 2, an A.C. signal representative of this noise would normally be fed from the valve 5 to the input 37 of the oscillator 38, resulting in the opening for transmission of the channel 1 and the closing for transmission of the channel 12. To prevent this occurring a rectified signal derived from the noise detecting microphone 28 is fed to the input 37 of the oscillator 38. The effect of this rectified signal is to bias the oscillator 38 so that reception by it of the noise representative A.C. signal from the valve 5 does not actuate the oscillator 38.

The removal of the negative D.C. bias also simultaneously removes that fraction thereof which is used to reduce the gain of valve 5, whereupon the gain of this valve 5 is restored to its usual value.

When the user speaks into the microphone 2, the user's voice signals are amplified in the valve 5 operating at full gain, thereby producing an A.C. voice signal at the output side of the valve 5. The A.C. voice signal is applied to the input 37 of the switching oscillator 38. This oscillator is so arranged that during the receipt of the positive peaks of the A.C. voice signal it produces oscillations in the output 47 thereof. These oscillations are rectified by the diode 48, to produce a D.C. output characteristic of the oscillations, the latter mentioned D.C. output being fed to the point B via the resistance-capacitance-network 49. This D.C. output is of negative polarity and, in consequence, changes the polarity of the potential at the point B from its initial positive value to a negative value.

As soon as the positive potential at the point B is exceeded by the negative D.C. potential from the diode 48, the diodes 52 and 55 become non-conductive, and no longer shunt signals incoming via resistances 50 and 51. Whereupon the user's speech signals are fed to the amplifier stage 10, and thence to the loundspeaker 11, which latter feeds sound energy to the mouth-piece of the hand-set.

The negative D.C. potential at the point B is also applied to the cathode 58 of the diode 59 in the switching arrangement 24. This negative D.C. potential reverses the polarity of the cathode 58 and causes the diode 59 to conduct. As soon as the diode 59 conducts, any incoming signals which may now be appearing at the output of the valve 17 are shunted to earth via the condenser 58A. The negative D.C. potential is also conducted via resistances 61 and 62 to the grid 16 of the valve 17. This D.C. potential biases the grid 16 of the valve 17, thereby to cut off the valve 17. The combined effects of the conductivity of diode 59 and the cutting off of valve 17 renders the second amplifying channel non-conductive.

I claim:

1. An amplifying device for use with a telephone hand-set comprising a first signal channel, a microphone connected to said first channel, a first amplifier included in said first channel, an output of said first amplifier, a loudspeaker connected to said output of said first amplifier for operation thereby and for feeding audible signals to a mouthpiece of a telephone handset, a second signal channel, means responsive to signals derivable from an earpiece of said handset and connected to said second channel, a second amplifier connected in said second channel, an output of said second amplifier, a second loudspeaker connected to said output for operation thereby, an electronic switching device included in one of said two channels, an electronic oscillator, an oscillator input, means for deriving a control voltage from said one channel and connected to said oscillator input for applying thereto said control voltage, an oscillator output at which an oscillating voltage appears when said control voltage exceeds a pre-determined value, means responsively coupling together said two channels for controlling the magnitude of said control voltage and means for responsively connecting said oscillator output to said electronic switching device for causing said switching device to block said one channel to the transmission of signals when voice signals are being transmitted in said other channel and also when no voice signals are being transmitted in either channel, and for causing said switching device to open said one channel to the transmission of voice signals when no voice signals are transmitted in said other channel but when voice signals transmitted in said one channel result in said control voltage reaching said pre-determined value.

2. An amplifying device according to claim 1, wherein said means for responsively coupling together said channels comprises means for deriving a control parameter from said other channel, which parameter is responsive to the transmission of voice signals in said other channel, and means for applying the control parameter so derived to said one channel so as to control the magnitude of said control voltage.

3. An amplifying device according to claim 1, wherein said means for responsively coupling together said channels comprises means for deriving a control parameter from said other channel, which parameter is responsive to the transmission of voice signals in said other channel, and means for applying the parameter so derived to the input of said oscillator so as to control the magnitude of the control voltage applied to said oscillator.

4. An amplifying device according to claim 1, and furthermore comprising a further electronic switching device included in said other channel, and further means for responsively connecting said oscillator output to said further electronic switching device for causing said further switching device to block said other channel to the transmission of voice signals when said one channel is opened to the transmission of voice signals.

5. An amplifying device according to claim 2, wherein said means for applying the control parameter so derived to said one channel is connected to said first amplifier so as to vary the gain of said first amplifier.

6. An amplifying device according to claim 1, and furthermore comprising delay means coupled to said oscillator output for delaying the application of said oscillating voltage to said electronic switching device so as to avoid the production in said channels of audible noises due to switching transients.

7. An amplifying device according to claim 1, and furthermore comprising means for deriving an electrical parameter responsive to the intensity of surrounding noise signals and means for applying the parameter so derived to the input of said oscillator so as to compensate for the portion of said control voltage arising from said surrounding noise signals as detected by said microphone.

References Cited in the file of this patent

OTHER REFERENCES

| | | |
|---|---|---|
| 2,166,775 | Varley | July 18, 1939 |
| 2,699,464 | Di Toro et al. | Jan. 11, 1955 |